United States Patent [19]

Masumoto

[11] Patent Number: 5,210,540
[45] Date of Patent: May 11, 1993

[54] GLOBAL POSITIONING SYSTEM
[75] Inventor: Yutaka Masumoto, Kawagoe, Japan
[73] Assignee: Pioneer Electronic Corporation, Tokyo, Japan
[21] Appl. No.: 897,710
[22] Filed: Jun. 12, 1992
[30] Foreign Application Priority Data Jun. 18, 1991 [JP] Japan .................................. 3-146039

[51] Int. Cl.⁵ ........................ H04B 7/185; G01S 5/02
[52] U.S. Cl. ..................................... 342/357; 364/449
[58] Field of Search ................. 342/357, 462; 364/449

[56] References Cited
U.S. PATENT DOCUMENTS 4,731,613 3/1988 Endo et al. .......................... 342/357

Primary Examiner—Theodore M. Blum
Attorney, Agent, or Firm—Kane, Dalsimer, Sullivan, Kurucz, Levy, Eisele and Richard

[57] ABSTRACT

A global positioning system for positioning a mobile object such as an automobile in a global geometrical region includes a GPS receiver for receiving radio waves from a plurality of satellites and outputting either two-dimensional position data indicative of the present position of the mobile object in a two-dimensional position measurement mode or three-dimensional position data indicative of the present position of the mobile object in a three-dimensional position measurement mode. An altimeter detects a relative altitude of the mobile object and outputs relative altitude data indicative of the detected relative altitude. A present position output unit calculates present position data indicative of the present position of the mobile object solely based on the data from the GPS receiver while the GPS receiver is operating in the three-dimensional position measurement mode. When the GPS receiver operates in the two-dimensional position measurement mode, the present position output unit calculates present position data indicative of the present position of the mobile object based on the two-dimensional position data and the relative altitude data. The calculated present position data are sent to a display which displays the two-dimensional position of the mobile object and also the altitude data.

10 Claims, 5 Drawing Sheets

GLOBAL POSITIONING SYSTEM

BACKGROUND OF THE INVENTION

1. Field of the Invention

The present invention relates to a global positioning system for determining the position of a mobile object such as an automobile in a global geometrical region.

2. Description of the Prior Art

There are known global positioning systems (GPS) for determining the position of a mobile object in a global geometrical region. Typically, a global positioning system includes a receiver for receiving radio waves transmitted from three or more GPS satellites. The global positioning system determines the position of a reception point where the receivers have received the radio waves, based on quasi-distance data between the GPS satellites and the reception point, including a time offset of the receiver, and positional data of the GPS satellites.

For two-dimensionally determining the position of the mobile object, i.e., determining the latitude and longitude of the mobile object, it is necessary to measure the quasi-distance data with respect to the three GPS satellites. The three data are required because there are mathematically three unknown quantities, i.e., the two-dimensional positions of the mobile object and a deviation or error between the clock of the GPS satellites and the clock of the receiver, or the time offset of the receiver.

If the three-dimensional position (including the altitude) of a mobile object is to be determined by a global positioning system, the global positioning system needs measurement of data with respect to four GPS satellite as there are four unknown quantities involved. Actually, while such a global positioning system associated with a mobile body such as a running automobile is in operation, one of the four GPS satellites may possibly be shielded by an obstacle such as a building, a structure, a tree, or the like near the receiver, and the receiver may be able to receive radio waves from only the remaining three GPS satellites. In such an occasion, the global positioning system can determine the position of the mobile object only two-dimensionally, and produces latitude and longitude data as its output data, but not altitude data.

One conventional global positioning system operates to solve the above problem as follows: When the global positioning system is forcibly shifted from the three-dimensional position measurement mode to the two-dimensional position measurement mode due to an obstacle, as described above, the global positioning system maintains the altitude data obtained in a previous cycle in the three-dimensional position measurement mode, and employs the maintained previous altitude data to produce approximate three-dimensional position data as output data.

FIG. 1 of the accompanying drawings shows such a conventional global positioning system.

First, a controller of the global positioning system determines whether the position of a mobile object can be determined three-dimensionally in a step S20. If the position of the mobile object can be determined three-dimensionally, i.e., if the global positioning system is receiving radio waves from four GPS satellites, then the global positioning system calculates the present position of the mobile object from the received radio waves in a step S21, and produces latitude data $X_1$, longitude data $Y_1$, and altitude data $Z_1$ as output data in a step S22. Then, control goes to an end. If the position of the mobile object cannot be determined three-dimensionally in the step S20, then the controller of the global positioning system determines whether the position of the mobile object can be determined two-dimensionally in a step S23. If the position of the mobile object can be determined two-dimensionally in the step S23, i.e., if the global positioning system is receiving radio waves from three of the four GPS satellites, then the global positioning system calculates latitude data $X_2$ and longitude data $Y_2$ in a step S24. Thereafter, the global positioning data produces the latitude data $X_2$, longitude data $Y_2$, and the previously calculated altitude data $Z_1$ as quasi-data in a step S25. Then, control is ended. If the position of the mobile object cannot be determined two-dimensionally in the step S23, the global positioning system produces no position data in a step S26, and control comes to an end.

With the above conventional global positioning system, however, since it employs altitude data obtained in the previous cycles of the three-dimensional position measurement mode when the three-dimensional position measurement mode is disabled in a present cycle, the output data suffer a relatively large error when the altitude of the mobile object varies largely as when the mobile object runs uphill.

SUMMARY OF THE INVENTION

It is an object of the present invention to provide a global positioning system capable of producing correct data as to the present position of a mobile object even when the position of the mobile object can be measured only two-dimensionally.

According to the present invention, there is provided a global positioning system for positioning a mobile object in a global geometrical region, comprising receiving means for receiving radio waves from a plurality of satellites and outputting either two-dimensional position data indicative of the present position of the mobile object in a two-dimensional position measurement mode or three-dimensional position data indicative of the present position of the mobile object in a three-dimensional position measurement mode, detecting means for detecting a relative altitude of the mobile object and outputting relative altitude data indicative of the detected relative altitude, and calculating means for calculating and outputting present position data indicative of the present position of the mobile object based on the two-dimensional position data in the two-dimensional position measurement mode and the relative altitude data when the receiving means outputs the two-dimensional position data in the two-dimensional position measurement mode.

The detecting means detects a relative altitude of the mobile object and outputs relative altitude data indicative of the detected relative altitude. As long as the receiving means outputs two-dimensional position data in the two-dimensional position measurement mode, the calculating means calculates and outputs present position data based on the two-dimensional position data and the relative altitude data. Therefore, even when the receiving means can operate only in the two-dimensional position measurement mode, the global positioning system can output correct present position data based on the relative altitude data as well as the two-dimensional position data.

The calculating means may calibrate the relative altitude data with altitude data of the three-dimensional position data previously output by the receiving means in the three-dimensional position measurement mode when the receiving means switches from the three-dimensional position measurement mode to the two-dimensional position measurement mode.

According to the present invention, there is also provided a global positioning system for positioning a mobile object in a global geometrical region, comprising receiving means for receiving radio waves from a plurality of satellites and outputting either two-dimensional position data indicative of the present position of the mobile object in a two-dimensional position measurement mode or three-dimensional position data indicative of the present position of the mobile object in a three-dimensional position measurement mode, the two-dimensional position data comprising latitude and longitude data, memory means for storing altitude data corresponding to the latitude and longitude data, and calculating means for reading the altitude data from the memory means based on the latitude and longitude data and outputting present position data indicative of the present position of the mobile object when the receiving means outputs the two-dimensional position data in the two-dimensional position measurement mode.

The receiving means receives radio waves from the satellites, and outputs two-dimensional position data indicative of the present position of the mobile object. The two-dimensional position data comprise latitude and longitude data. The memory means stores altitude data corresponding to the latitude and longitude data. When the receiving means operates in the two-dimensional position measurement mode, the calculating means reads altitude data from the memory means based on the latitude and longitude data, and outputs present position data. Therefore, even when the receiving means can operate only in the two-dimensional position measurement mode, the global positioning system can output correct present position data based on the stored altitude data as well as the latitude and longitude position data.

The above and other objects, features and advantages of the present invention will become more apparent from the following description when taken in conjunction with the accompanying drawings in which preferred embodiments of the present invention shown by way of illustrative example.

DETAILED DESCRIPTION OF THE PREFERRED EMBODIMENTS

Figure 1:
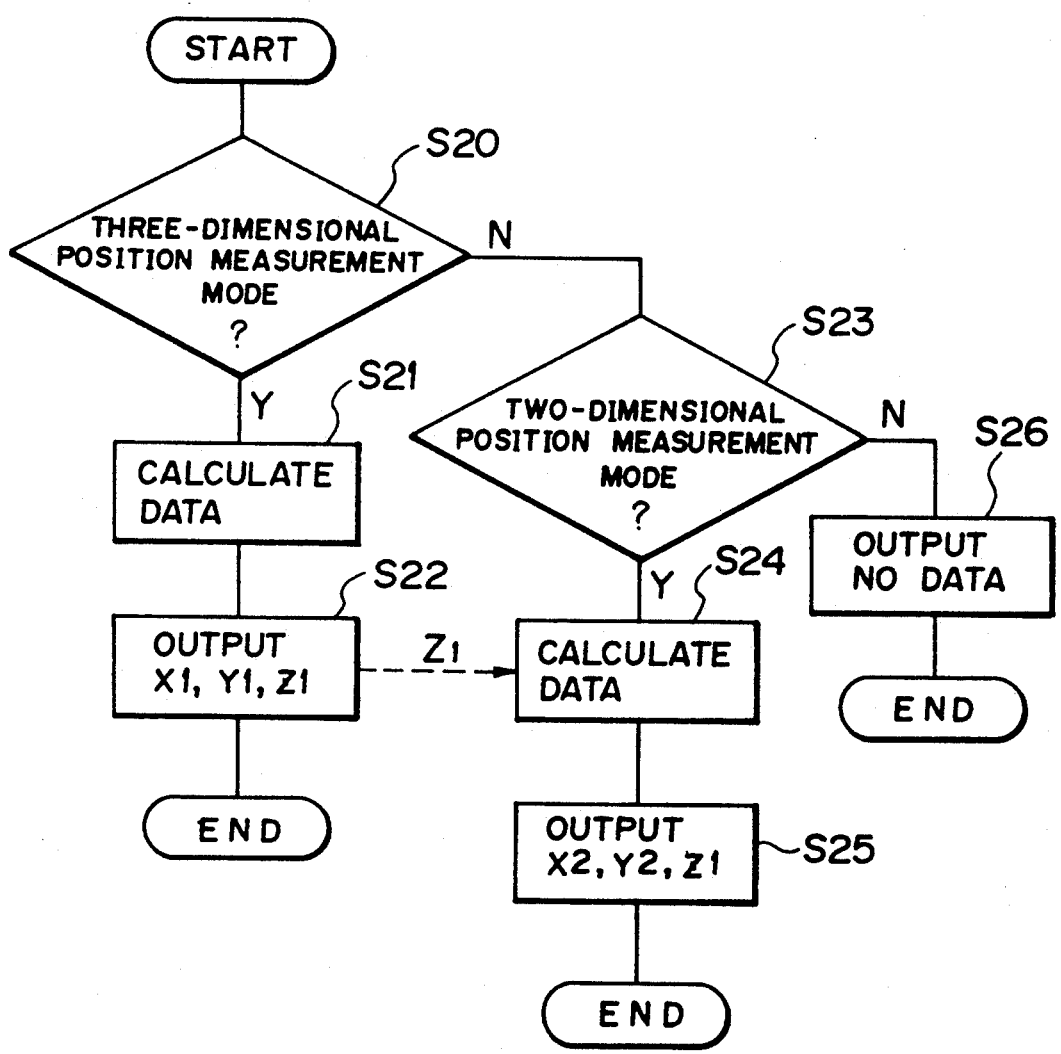
FIG. 1 is a flowchart of an operation sequence of a conventional global positioning system.

Like or corresponding parts are denoted by like or corresponding reference characters throughout views.

1ST EMBODIMENT

Figure 2:
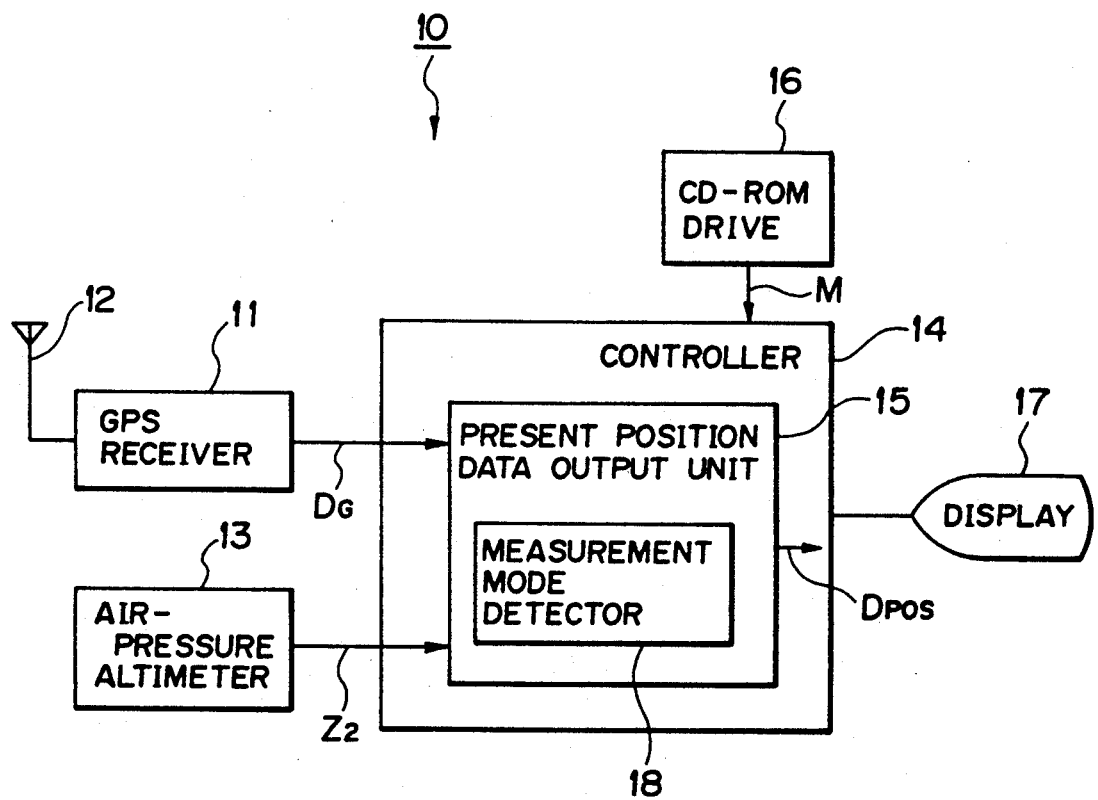
FIG. 2 is a block diagram of a global positioning system according to a first embodiment of the present invention.

FIG. 2 shows in block form a global positioning system according to a first embodiment of the present invention, as incorporated in a navigation system on an automobile.

The navigation system, generally designated by the reference numeral 10, has a GPS receiver 11 for receiving radio waves from GPS satellites through a GPS antenna 12, and producing GPS data $D_G$ including latitude data, longitude data, and altitude data.

The navigation system 10 also includes an air-pressure altimeter 13 for producing relative altitude data $Z_2$ corresponding to the difference in height between the present position of the automobile and a predetermined reference position. The relative altitude data $Z_2$ can be used as absolute altitude data when it is calibrated with an absolute altitude (a height from the sea level), used as a reference position, which corresponds to altitude data produced by the GPS receiver 11.

The navigation system 10 also includes a controller 14 having a present position data output unit 15 which in turn has a measurement mode detector 18 for detecting a measurement mode based on the GPS data $D_G$ from the GPS receiver 11. The measurement mode detector 18 detects a three-dimensional position measurement mode when all radio waves can be received from four GPS satellites, and a two-dimensional position measurement mode when radio waves can be received from only three of the four GPS satellites.

The present position data output unit 15 outputs present position data based on the GPS data $D_G$ from the GPS receiver 11 if the GPS receiver 11 can operate in the three-dimensional position measurement mode. If the GPS receiver 11 can operate only in the two-dimensional position measurement mode, then the present position data output unit 15 outputs present position data $D_{POS}$ based on the latitude data and longitude data from the GPS receiver 11 and absolute altitude data determined based on relative altitude data produced by the air-pressure altimeter 13. The controller 14 effects map matching between the present position data $D_{POS}$ and map data M read from a ROM map by a CD-ROM drive 16, and outputs display data for displaying the present position of the automobile on a display 17. The display 17 displays the position of the automobile based on the latitude data and longitude data, and also displays the altitude data by way of numerals.

In FIG. 2, the GPS receiver 11, the air-pressure altimeter 13, and the present position data output unit 15 jointly serve as the global positioning system.

Figure 3:
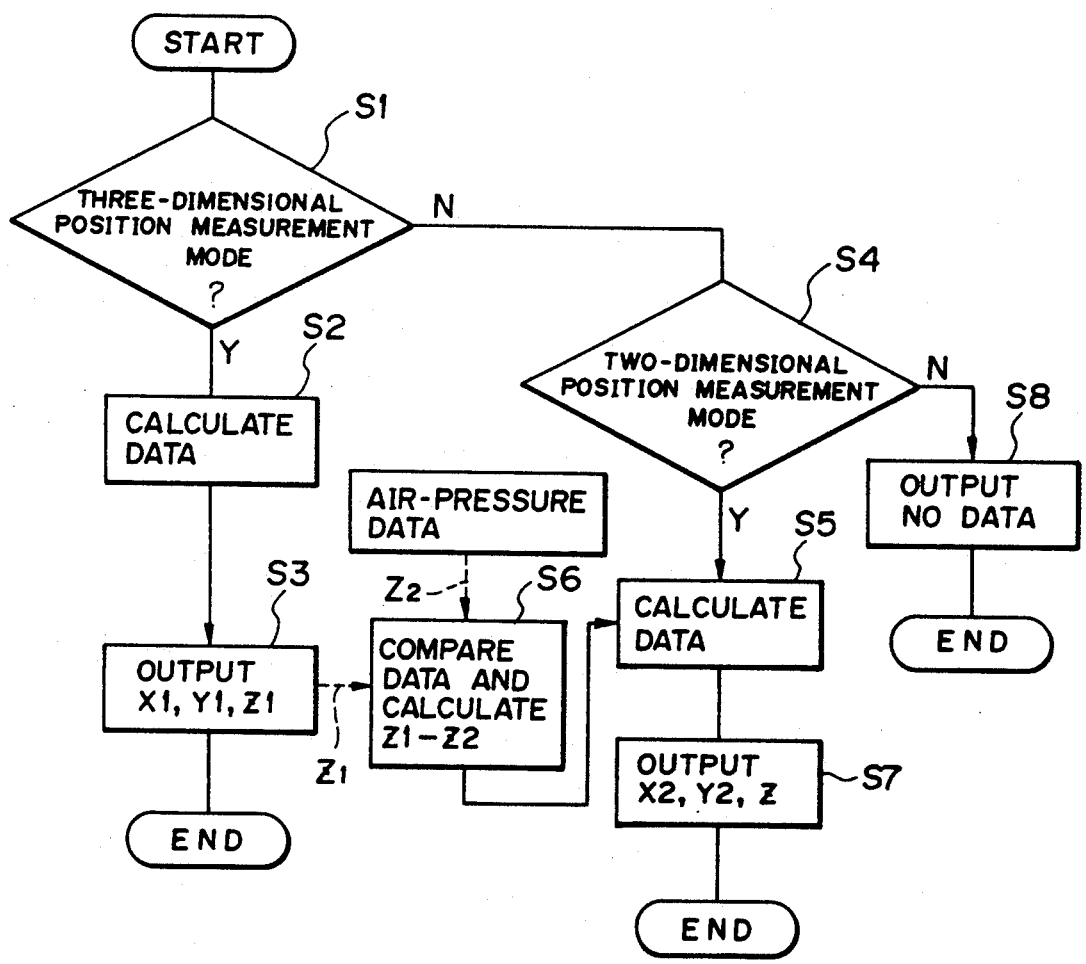
FIG. 3 is a flowchart of an operation sequence of the global positioning system according to the first embodiment of the present invention.

Operation of the global positioning system shown in FIG. 2 will be described below with reference to FIG. 3.

First, the present position data output unit 15 determines whether the GPS receiver 11 can operate in the three-dimensional position measurement mode in a step S1.

If the GPS receiver 11 can operate in the three-dimensional position measurement mode, i.e, if the GPS receiver 11 can receive radio waves from the four GPS satellites, then the GPS receiver 11 calculates the present position thereof from the received radio waves in a step S2, and outputs latitude data $X_1$, longitude data $Y_1$, and altitude data $Z_1$ as GPS data $D_G$ to the present position data output unit 15, which in turn outputs the latitude data $X_1$, longitude data $Y_1$, and altitude data $Z_1$ as present position data $D_{POS}$ in a step S3. Thereafter, control is brought to an end.

If the GPS receiver 11 cannot operate in the three-dimensional position measurement mode in the step S1, then present position data output unit 15 determines whether the GPS receiver 11 can operate in the two-dimensional position measurement mode in a step S4.

If the GPS receiver 11 can operate in the two-dimensional position measurement mode, i.e, if the GPS receiver 11 can receive radio waves from three of the four GPS satellites, then the GPS receiver 11 calculates the present position thereof from the received radio waves in a step S5, and outputs latitude data $X_2$ and longitude data $Y_2$ as GPS data $D_G$ to the present position data output unit 15.

The air-pressure altimeter 13 outputs relative altitude data $Z_2$ at all times. The present position data output unit 15 compares altitude data $Z_1$ obtained by the GPS receiver 11 in a previous cycle of the three-dimensional position measurement mode with the present relative altitude data $Z_2$, and calculates the difference between the compared altitude data in a step S6, thus producing present (absolute) altitude data Z in the step S5. The present position data output unit 15 outputs the latitude data $X_2$, longitude data $Y_2$, and altitude data Z as present position data $D_{POS}$ in a step S7. Control then comes to an end.

If the GPS receiver 11 cannot operate in the two-dimensional position measurement mode in the step S4, then the present position data output unit 15 outputs no present position data $D_{POS}$ in a step S8. Control is then ended.

As described above, insofar as the GPS receiver 11 can operate in the three-dimensional position measurement mode, the global positioning system outputs the GPS data $D_G$ from the GPS receiver 11 as present position data $D_{POS}$. In the event that the GPS receiver 11 can operate only in the two-dimensional position measurement mode, the global positioning system determines absolute altitude data based on relative altitude data from the air-pressure altimeter 13, and produces and outputs present position data $D_{POS}$ based on the absolute altitude data and the GPS data $D_G$. Therefore, the global positioning system can output correct present position data $D_{POS}$ at all times.

2ND EMBODIMENT

Figure 4:
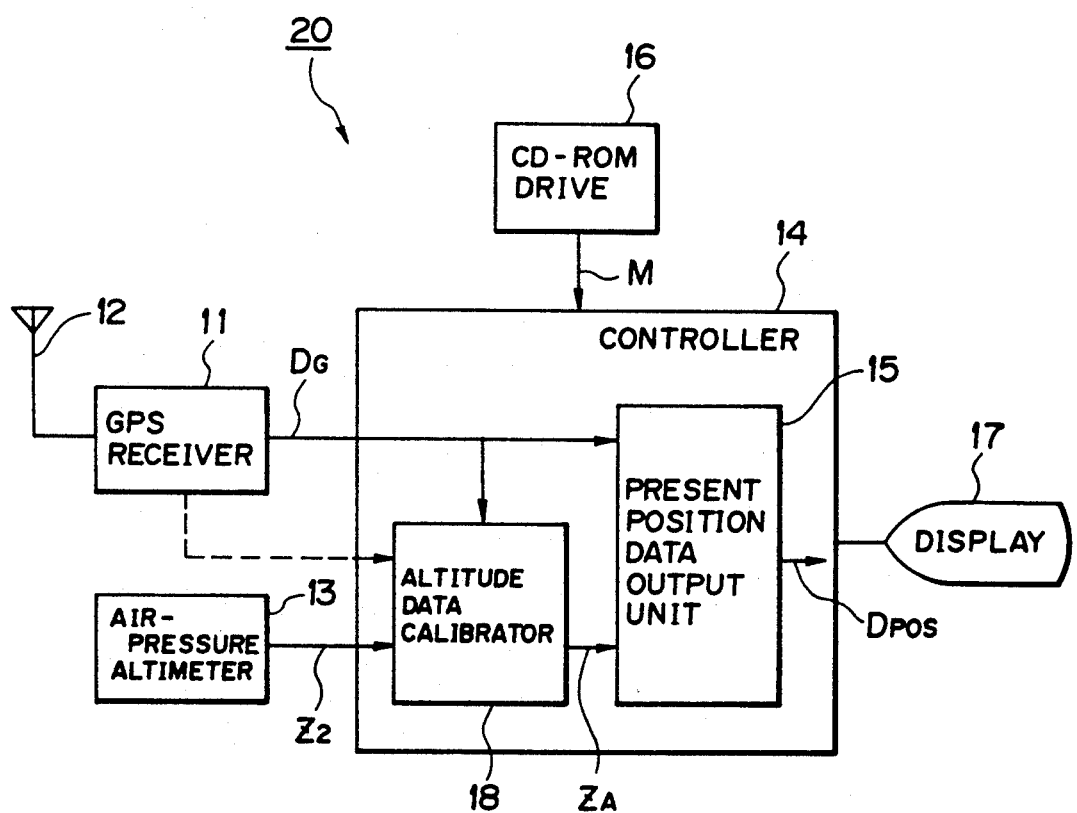
FIG. 4 is a block diagram of a global positioning system according to a second embodiment of the present invention.

FIG. 4 shows in block form a global positioning system according to a second embodiment of the present invention.

The global positioning system according to the second embodiment is incorporated in a navigation system 20 on an automobile. The global positioning system according to the second embodiment differs from the global positioning system according to the first embodiment in that it has an altitude data calibrator 18 for calibrating relative altitude data $Z_2$ from the air-pressure altimeter 13 with altitude data obtained by the GPS receiver 11 in a previous cycle of the three-dimensional position measurement mode when the GPS receiver 11 switches from the three-dimensional position measurement mode to the two-dimensional position measurement mode, and for subsequently outputting absolute altitude data $Z_A$ based on the relative altitude data $Z_2$.

As long as the GPS receiver 11 operates in the two-dimensional position measurement mode, the present position data output unit 15 outputs present position data $D_{POS}$ using the absolute altitude data $Z_A$ output by the altitude data calibrator 18.

Each time the GPS receiver 11 switches from the three-dimensional position measurement mode to the two-dimensional position measurement mode, therefore, the altitude data calibrator 18 calibrates the relative altitude data $Z_2$ from the air-pressure altimeter 13 with latest altitude data of the GPS data $D_G$. Consequently, the absolute altitude data $Z_A$ based on the relative altitude data $Z_2$ from the air-pressure altimeter 13 is rendered more accurate, and the present position data output unit 15 can output more correct present position data $D_{POS}$.

The above calibration process carried out by the altitude data calibrator 18 is also effective to compensate for defective operation of the air-pressure altimeter 13. The air-pressure altimeter 13 measures a relative altitude from a reference position based on the measured atmospheric pressure. Therefore, the air-pressure altimeter 13 alone is governed by the temperature or weather condition at the time it measures the relative height, and cannot output proper altitudes under certain conditions. In the second embodiment shown in FIG. 4, however, since an altitude measured by the air-pressure altimeter 13 is calibrated using the latest altitude data obtained by the GPS receiver 11 in the three-dimensional position measurement mode, the altitude data calibrator 18 can output more accurate altitude data.

In the illustrated second embodiment, the altitude data calibrator 13 calibrates an altitude measured by the air-pressure altimeter 13 when the GPS receiver 11 switches from the three-dimensional position measurement mode to the two-dimensional position measurement mode. However, the altitude data calibrator 13 may calibrate an altitude measured by the air-pressure altimeter 13 at all times or at certain time intervals while the GPS receiver 11 is operating in the three-dimensional position measurement mode.

3RD EMBODIMENT

Figure 5:
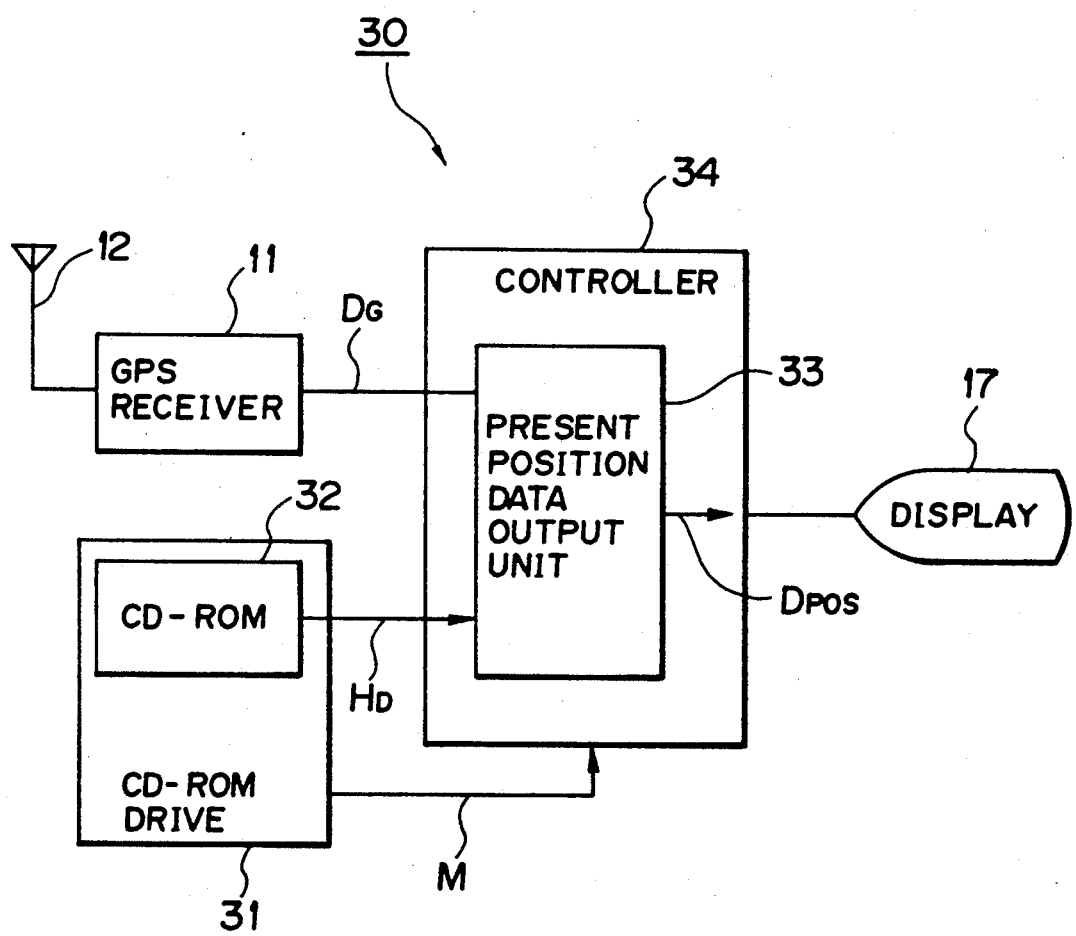
FIG. 5 is a block diagram of a global positioning system according to a third embodiment of the present invention.

FIG. 5 shows in block form a global positioning system according to a third embodiment of the present invention.

The global positioning system according to the third embodiment is incorporated in a navigation system 20 on an automobile. The GPS receiver 11 receives radio waves from GPS satellites through the GPS antenna 12, and produces GPS data $D_G$ including latitude data, longitude data, and altitude data.

The navigation system 20 includes a CD-ROM 32 storing map data M together with altitude data corresponding to latitude and longitude data, e.g., altitude data $H_D$ of major roads at intervals of several kilometers, and a CD-ROM drive 31 for reading and outputting, from the CD-ROM 32, the map data M and altitude data $H_D$ of a point closest to the present latitude and longitude data or altitude data $H_D$ of a plurality of points with respect to the map data M.

The navigation system 20 also includes a controller 34 having a present position data output unit 33 which, when the GPS receiver 11 can operate only in the two-dimensional position measurement mode, outputs, as present position data $D_{POS}$, altitude data $H_D$ output by the CD-ROM drive 31 or altitude data calculated based on altitude data $H_D$ output by the CD-ROM drive 31, and latitude and longitude data output by the GPS receiver 11. Accordingly, the present position data output unit 33 can output correct present position data $D_{POS}$ at all times.

In FIG. 5, the GPS receiver 11, the CD-ROM drive 31, and the present position data output unit 33 jointly serve as the global positioning system.

Insofar as the GPS receiver 11 can operate in the three-dimensional position measurement mode, the controller 34 effects map matching between the present position data $D_{POS}$ and map data M read from the CD-ROM 32 by the CD-ROM drive 31 based on the GPS data $D_G$ from the GPS receiver 11, and produces and outputs display data for displaying the present position of the automobile on the display 17. If the GPS receiver 11 can operate only in the two-dimensional position measurement mode, then the controller 34 produces display data based on the latitude data and longitude data from the GPS receiver 11 and the altitude data $H_D$ from the CD-ROM 32, and outputs the display data to display the present position of the automobile on the display 17. The display 17 displays the position of the automobile based on the latitude data and longitude data, and also displays the altitude data by way of numerals.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A global positioning system for positioning a mobile object in a global geometric region, comprising:
   receiving means for receiving radio waves from a plurality of satellites and outputting one of (1) two-dimensional position indicative of the present position of the mobile object in a two-dimensional position measurement mode and (2) three-dimensional position data indicative of the present position of the mobile object in a three-dimensional position measurement mode, said two-dimensional position data comprising latitude and longitude data;
   memory means for storing altitude data corresponding to said latitude and longitude data; and
   calculating means for reading said altitude data from said memory means based on said latitude and longitude data and outputting present position data indicative of the present position of the mobile object when said receiving means outputs the two-dimensional position data in the two-dimensional position measurement mode.

2. A global positioning system according to claim 1, wherein said memory means is a CD-ROM.

3. A global positioning system for positioning a mobile object in a global geometrical region, comprising:
   receiving means for receiving radio waves from a plurality of satellites and outputting one of (1) two-dimensional position data indicative of the present position of the mobile object in a two-dimensional position measurement mode and (2) three-dimensional position data indicative of the present position of the mobile object in a three-dimensional position measurement mode;
   detecting means for detecting a relative altitude of the mobile object and outputting relative altitude data indicative of the detected relative altitude; and
   calculating means for calculating and outputting present position data indicative of the present position of the mobile object based on said two-dimensional position data in said two-dimensional position measurement mode and said relative altitude data when said receiving means outputs the two-dimensional position data in the two-dimensional position measurement mode, said calculating means comprising means for calibrating said relative altitude data with altitude data of the three-dimensional position data previously output by said receiving means in said three-dimensional position measurement mode when said receiving means switches from said three-dimensional position measurement mode to said two-dimensional position measurement mode.

4. A global positioning system according to claim 3, wherein said detecting means is comprised of an air-pressure altimeter.

5. A global positioning system according to claim 3, wherein said calculating means includes mode detecting means for detecting whether said receiving means outputs the two-dimensional position data in the two-dimensional position measurement mode or the three-dimensional position data in the three-dimensional position measurement mode.

6. A global positioning system according to claim 5, wherein said detecting means is comprised of an air-pressure altimeter.

7. A global positioning system for positioning a mobile object in a global geometrical region, comprising:
   receiving means for receiving radio waves from a plurality of satellites and outputting one of (1) two-dimensional position data indicative of the present position of the mobile object in a two-dimensional position measurement mode and (2) three-dimensional position data indicative of the present position of the mobile object in a three-dimensional position measurement mode;
   detecting means for detecting a relative altitude of the mobile object and outputting relative altitude data indicative of the detected relative altitude; and
   calculating means for calculating and outputting present position data indicative of the present position of the mobile object based on said two-dimensional position data in said two-dimensional position measurement mode and said relative altitude data when said receiving means outputs the two-dimensional position data in the two-dimensional position measurement mode, said calculating means comprising means for calibrating said relative altitude data with altitude data of the three-dimensional position data previously output by said receiving means in said three-dimensional position measurement mode, at all times with predetermined time intervals when said receiving means outputs the three-dimensional position data in said three-dimensional position data in said three-dimensional position measurement mode.

8. A global positioning system according to claim 7, wherein said detecting means is comprises of an air-pressure altimeter.

9. A global positioning system according to claim 7, wherein said calculating means includes mode detecting means for detecting whether said receiving means outputs the two-dimensional position data in the two-dimensional position measurement mode or the three-dimensional position data in the three-dimensional position measurement mode.

10. A global positioning system according to claim 9, wherein said detecting means is comprised of an air-pressure altimeter.

* * * * *